July 31, 1928.

L. C. HUFF 1,679,219

MULTIORIFICE VALVE

Filed Feb. 11, 1925

Witness:
Stephen T. Rebora

Inventor:
Lyman C. Huff,
by Frank L. Belknap
Atty.

July 31, 1928.
L. C. HUFF
1,679,219
MULTIORIFICE VALVE
Filed Feb. 11, 1925
2 Sheets-Sheet 2
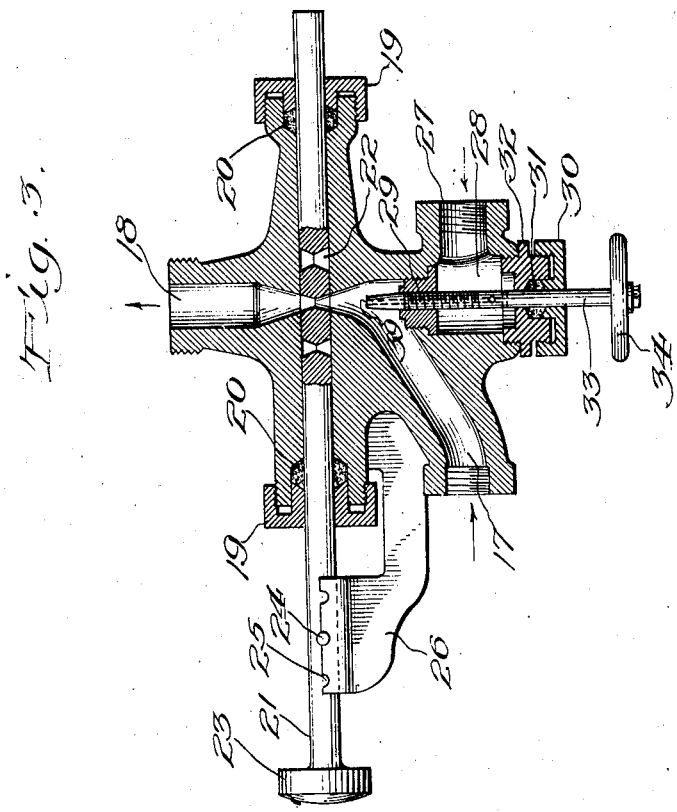
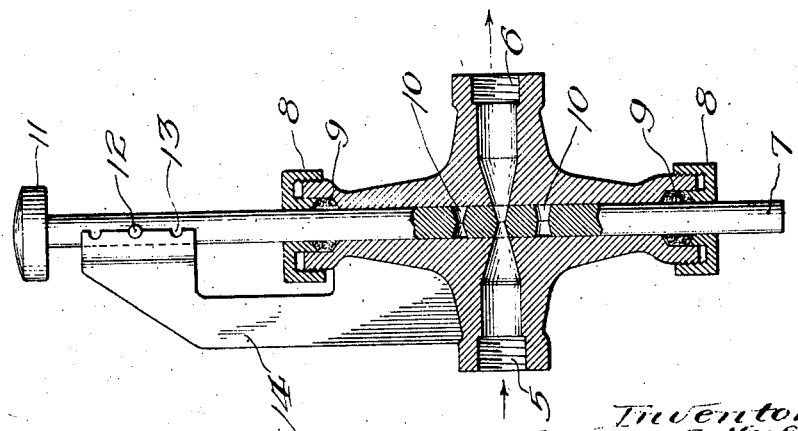

Patented July 31, 1928.

1,679,219

UNITED STATES PATENT OFFICE.

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

MULTIORIFICE VALVE.

Application filed February 11, 1925. Serial No. 8,350.

This invention relates to a multi-orifice valve and refers more particularly to liquid supply valves provided with a plurality of orifices of varying size, useful where accurate regulation and uniform feed is essential.

The specific embodiment of the present invention resides in the construction of a multi-orifice valve suitable for regulating the supply of fuel oil to a burner. Frequently, valves employed for regulating the introduction or feed of oil clog on account of the presence in said oil of suspended pitch-like solid particles, which lodge and build up around any projection or sharp points in the interior of the valve chamber.

In the valve of the present construction, the arrangement is such that the oil passing through the lines under pressure, held constant by means of a pump or the like, is caused to pass through valve openings of the tapering Venturi type, which openings exhibit no sharp spots or projections on which the suspended particles can lodge, thus insuring a constant and uniform flow of oil therethrough. The slidable stem is provided intermediate its length with a plurality of spaced orifices of varying size, and with locking elements on said stem adapted to register with recesses or the like, in a bracket attached to the valve chamber, the latter serving the purpose of locking the stem in its various positions. One or more valves may be interposed in the oil supply lines, and where two or more are employed in the same lines, the valve stems may be alternately arranged to be movable in either a horizontal or vertical plane. Air or steam may be supplied to the orifices by interposing steam or air discharge nozzles directly adjacent the orifices in the valve stem, the function of the latter being to assist the passage of the oil through the orifices and prevent any clogging of the orifice openings.

The valves of the present invention are particularly adapted for regulating the flow of fuel oil to a burner, or the supply of charging stock to a distilling or cracking system.

In the drawings:

Fig. 2 is an enlarged cross sectional view of the valve chamber 4 of Fig. 1.

Fig. 3 is an enlarged cross sectional view of the valve chamber 16 of Fig. 1.

Figure 1:
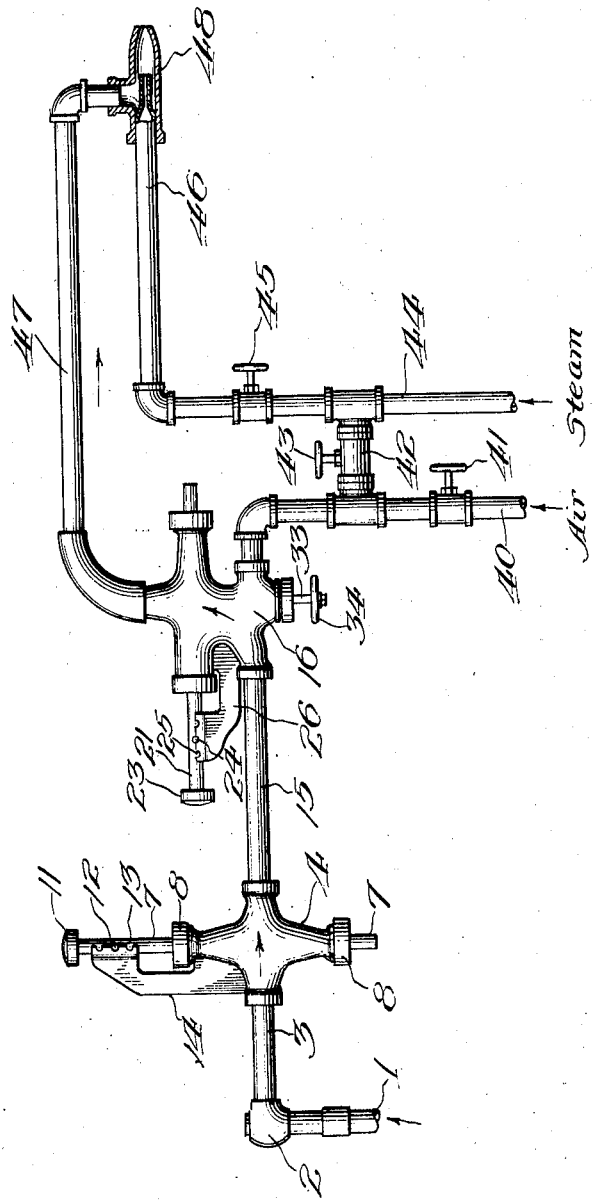
Fig. 1 is a side elevational view illustrating the installation of the invention.

Referring in detail to the drawings, 1 designates the inlet for the liquid such as oil, introduced thereto under pressure, for instance, between 5 and 50 pounds, held constant by means of a pump governor or the like. Said oil may pass through the usual form of float check valve in housing 2 to the connecting line 3, which latter communicates with the valve chamber designated as a whole 4. As shown clearly in the enlarged view in Fig. 2, the valve chamber has inlet 5 and outlet 6, and in this instance, is provided with the vertical conduit in which the valve stem 7 is adapted to be movable. The upper and lower ends of the chamber surrounding the valve stem are closed by means of the stem bushings 8, screw threaded into place and provided with the usual packing 9.

Referring now to one of the features of the present invention, the valve stem 7 is provided intermediate its length with a plurality of inwardly tapering Venturi shaped orifices or openings 10, the points of greatest diameter of each opening being substantially similar in size with the sizes of the inlet and outlet. As a feature of the invention, there are a plurality of spaced openings 10 in the stem of varying size, that is, all being substantially of the same size at their points of greatest diameter but of different total cross sectional area at their points of smallest diameter.

The stem 7 may be provided with the handle 11 and pin or similar projection 12, said stem being readily movable and easily locked in any position after movement by causing the pin 12 to register with one of the recesses 13 formed in the bracket 14 which projects outwardly from the valve chamber.

By the arrangement just described, it will be readily apparent that the size of orifice can be accurately regulated and changes in size made very readily during operation. The oil passes through the outlet 6 into the connecting pipe 15 communicating with a second valve chamber designated as a whole 16. An enlarged cross sectional view of this chamber 16 is shown in Fig. 3, in which 17 designates an upwardly slanting inlet and 18 the outlet. The valve chamber 16 is provided with a central valve chamber, closed at both ends by the stem bushings 19 and packing 20. A valve stem 21, adapted in this instance, to be in a horizontal plane, is inserted in the valve chamber, provided intermediate its length, with the inwardly tapering orifices, or Venturi shaped passageways 22 of varying size adapted to register with the pinched or inwardly tapering inlet 17 and outlet 18. Stem 21 may be provided at one end with the handle 23, pins or studs 24 adapted to register with the recesses 25 in the bracket 26, the arrangement being such that the stem is adapted to be locked in any position by pins 24, and recesses 25. In order to assist the passage of liquids through the Venturi shaped passageways, there is tapped into the lower part of the chamber directly adajacent the inlet 17 an opening 27 discharging into chamber 28, the upper part of which is closed by a centrally apertured closure ring 29, similar to a stem bushing screw threaded into place. The lower end of chamber 28 is closed by the stem bushing 30, packing 31 and centrally apertured closure plug 32. A valve stem 33 having handle 34 extends into the chamber 28, said valve stem being centrally apertured at 39.

The arrangement is such that steam or air may be introduced into the chamber 28 and discharged through the valve stem duct 39 directly into the path of liquid being passed through the valve. By adjustment of the valve stem, it is possible to discharge said air or steam at any point adjacent the Venturi-shaped openings 22.

Referring back to Fig. 1, the air may be introduced through pipe 40 controlled by valve 41 into the inlet 27. Intermediate its length the pipe 40 communicates by means of pipe connection 42 and valve 43 with the steam inlet pipe 44, having valve 45, the arrangement being such that either air or steam, or a combination of both may be introduced to valve chamber 16 by an obvious manipulation of valves. The steam pipe 44 has a continuation 46 beyond the valve 45 for a purpose hereinafter described. The outlet 18 from valve chamber 16 discharges into connecting pipe 47, which latter discharges into nozzle 48, the arrangement being such that there is a mixture of steam and oil in the nozzle chamber to produce atomization of the oil, resulting in efficient burning.

It will be understood that I do not wish to limit myself to the particular type of passageway shown, some of the broad features of the invention being the provisioning of orifices of different sizes on the same valve stem; the tapering of said orifices to eliminate sharp edges; the means for readily varying the size of orifice; the means for locking the stem in any desired position and the accuracy of registration of the orifices with the inlet and outlet. The valve stems 7 and 21 may be termed sliding orifice rods. The air or steam of course, is maintained and introduced under a constant pressure. Either of the valves 41 or 43 controls the pressure between the two multi-orifice valves and regulates the amount of oil that passes through the first valve. The flow of oil to the burner tip is regulated by varying the pressure in the line between the two orifice valves by the introduction of air, steam or other gas, thus eliminating the usual type of control valve, which is subject to plugging, especially when very small quantities of oil are being passed through it.

As mentioned above, the oil enters the first orifice valve 4 at a constant pressure, and as a slightly lower pressure is maintained in line 15 between the two orifice valves, a fairly large orifice can be used in valve 4. The pressure in line 15 is regulated and maintained by admitting air or steam into the adjustable nozzle 28 of valve 16 and is usually held at a slightly lower pressure than the oil in line 1. This enables the use of a large orifice in valve 4 through which small particles of carbon would pass unobstructed without clogging the valve.

The orifices 22 in valve 16 can also be relatively large because of the mixture of air or steam and oil passing through same. This allows a free and unobstructed passage for carbon particles and other foreign matter which may be suspended in the oil. Admitting a gas through the nozzle 39 also increases the velocity of the oil as it passes through the line 47 on its way to the burner.

One of the important features of the invention as illustrated in Fig. 1 is that it is self-cleaning, in that the liquid being introduced through the inlet 1 is at a constant pressure, thus keeping the check valve 2 open. The air or steam introduced through the valves 41 and 43 is also at a constant pressure. Should a slug of solid material carried in the oil plug the orifice 22, a back pressure would be built up, causing the check valve to close. This pressure would be sufficient to force the solid which was plugging the orifice 22 through the line 47 and nozzle 48. Further, if the nozzle 48 were plugged in a similar manner, the pressure would build up and force it out.

I claim as my invention:

1. In valves, the combination with a chamber having an inlet and an outlet each converging to a common diameter, of a slidable stem in said chamber, a plurality of orifices of different sizes in said stem, each of said orifices being so formed that the edges of each orifice will coincide with the inlet and outlet whereby no shoulder is presented at the juncture of the inlet and outlet with the orifices, said inlet and outlet tapering inwardly adjacent said orifices to present an unbroken smooth surface, and means for locking said stem in any adjusted position, comprising a notched bracket on said valve chamber for receiving projections on said slidable stem.

2. In valves, the combination with a chamber having an inlet and an outlet each converging to a common diameter, of a slidable stem in said chamber, a plurality of orifices of different sizes in said stem, each of said orifices being so formed that the edges of each orifice will coincide with the inlet and outlet whereby no shoulder is presented at the juncture of the inlet and outlet with the orifices, said inlet and outlet tapering inwardly adjacent said orifices to present an unbroken smooth surface, and means for locking said stem in any adjusted position, and an adjustable nozzle for introducing an inert gas under pressure directly into the path of liquid passing through the orifices.

LYMAN C. HUFF.